Jan. 20, 1970 B. A. FULTON 3,490,570
OVERUNNING CLUTCH

Filed Sept. 14, 1967 3 Sheets-Sheet 1

INVENTOR
BERTRAM A. FULTON
BY
*Blair Buckles, Cesari & St.Onge*
ATTORNEYS

Jan. 20, 1970  B. A. FULTON  3,490,570
OVERUNNING CLUTCH
Filed Sept. 14, 1967  3 Sheets-Sheet 2

INVENTOR.
BERTRAM A. FULTON
BY
Blair Buckles Cesari & St.Onge
ATTORNEYS

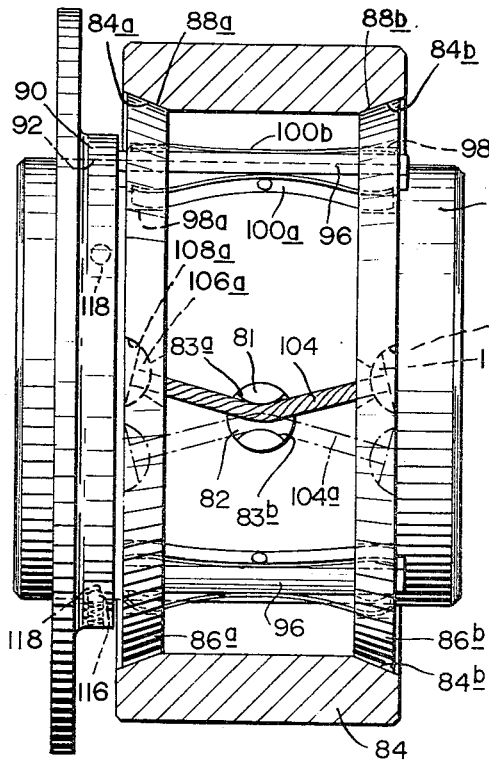
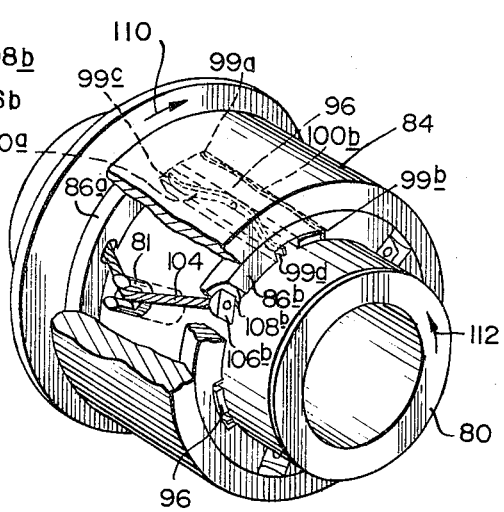
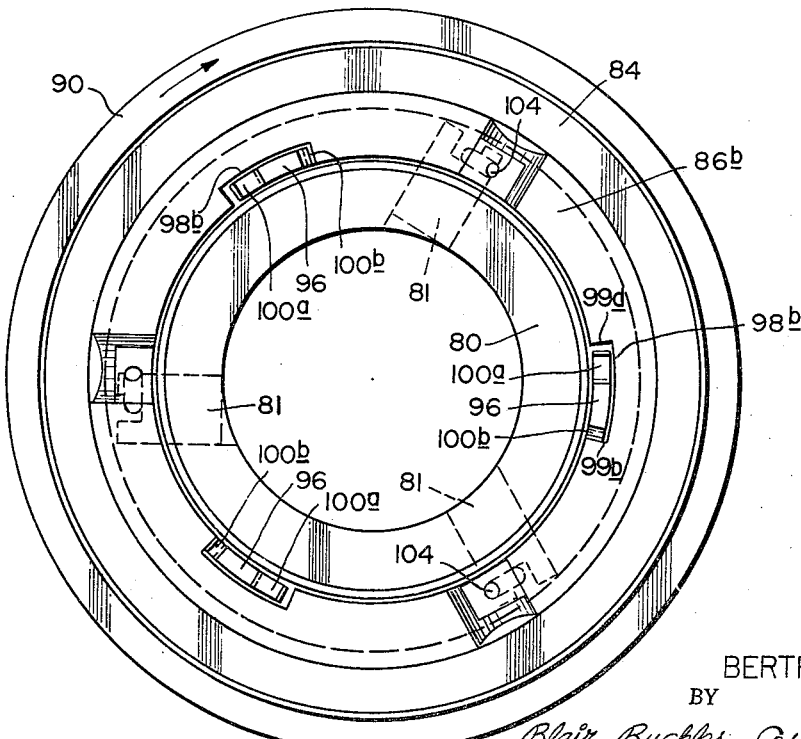

United States Patent Office

3,490,570
Patented Jan. 20, 1970

3,490,570
OVERRUNNING CLUTCH
Bertram A. Fulton, 19 Melch Road,
Lynnfield, Mass. 01940
Filed Sept. 14, 1967, Ser. No. 667,737
Int. Cl. F16d 11/06, 13/04, 41/10
U.S. Cl. 192—41                                    5 Claims

ABSTRACT OF THE DISCLOSURE

An improved overrunning clutch has a driving member and a driven member mounted coaxially for relative rotation about an axis. A gripper movable along the axis toward and away from one of the members frictionally engages the one member and tends to rotate therewith. A set of links are connected between the gripper and the other member. The links are all tilted or twisted at substantially the same angle relative to the axis. Thus, when the two members move in one direction relatively, the links move the gripper into nonslip engagement with the one member so that both members move in unison, and when the two members move in the opposite direction relatively, the links tend to move the gripper away from the one member so that the two members are free to move independently.

BACKGROUND OF THE INVENTION

Field of the invention

This invention relates to an improved overrunning clutch. As such, it is useful in any application demanding unidirectional power transmission. For example, it may be used in an automobile to transmit torque from the starting motor to the engine proper.

Description of the prior art

Conventional, directional or one-way clutches usually employ sprags, rollers and other such point or line contact active elements to couple together the driving and driven members of the clutch. Since these clutches transmit the power over relatively small areas of contact, particular parts are subjected to extremely high internal stresses. This leads to excessive wearing of those parts. Some reduction in these internal stresses is possible by employing a large number of such contacting elements, but not without considerably increasing the size and complexity of the clutch. Consequently, many of these prior clutches have relatively short useful lives or, alternatively, have a small power-to-weight ratio.

We are aware of one clutch which does distribute the internal forces over a relatively large area of contact. This prior clutch employs one or more relatively large area grippers which frictionally engage the driven member. A compressible, resilient, pressure transmitting body is disposed between the driving and driven members and moves with the driving member. The body is compressed in one direction when the two members move relatively in one direction whenever it pushes the grippers in a second direction into nonslip engagement with the driven members, causing both members to move in unison. On the other hand, when the two members move in the opposite direction relatively, the body is not compressed and therefore exerts no force on the grippers with the result that the two members are free to move independently.

While this last mentioned clutch is a vast improvement over conventional ones employing sprags, rollers and the like, its compressible pressure transmitting body is relatively expensive to make and it has a relatively short life particularly when used in an environment of hot lubricating oil.

Also, it should be mentioned that there is no provision in any of these prior clutches for conveniently reversing the direction of power transmission or for adjusting the clutch so that it is free-running in both directions. These features are very desirable in many applications.

SUMMARY OF THE INVENTION

Accordingly, it is an object of the present invention to provide an improved low-cost overrunning clutch.

A further object of the invention is to provide an overrunning clutch having a high torque capacity for its size.

A further object of the invention is to provide an overrunning clutch wherein stress is localized to a relatively few members.

Another object of the invention is to provide a clutch which operates satisfactorily in oily and high temperature environments.

A still further object of the invention is to provide a clutch which is controllable as to the direction of the clutching action.

A more specific object of the invention is to provide a clutch whose wear surfaces become more conforming with wear.

A further object of the invention is to provide an overrunning clutch characterized by low friction and relatively low internal stresses.

A still further object of the invention is to provide an overrunning clutch having minimum lag between its driving and driven members.

Still another object of the invention is to provide an overrunning clutch which is readily manufactured in a wide range of sizes to suit given applications.

Other objects of the invention will in part be obvious and will in part appear hereinafter.

The invention accordingly comprises the features of construction, combinations of elements and arrangement of parts which will be exemplified in the constructions hereinafter set forth, and the scope of the invention will be indicated in the claims.

Briefly, the overrunning clutch comprises a pair of coaxially mounted driving and driven members which rotate relatively about their common axis. A gripper is movable along said axis toward or away from one of these members, say, the driven member. The gripper and the driven member frictionally engage along mating surfaces so that the gripper tends to rotate with the driven member.

A set of links connected between the driving member and the gripper are disposed about the axis. The links are oriented relative to the axis so that they all have substantially the same attitude relative thereto. Rotation of the driving member in one direction relative to the driven member coupled with the frictional drag exerted by the driven member on the gripper tends to further tilt or wind up the links. Resultantly they move the gripper into nonslip engagement with the driven member so that the two members are locked together and move in unison. However, when the driving member rotates in the opposite direction, relatively, the links straighten up or unwind so that the gripper is biased away from the driven member, and the clutch thereupon overruns.

The clutch may employ only one gripper as described above, or two which engage opposite ends of the driven member in unison and thereby increase the efficiency of the clutch and minimize thrust stresses thereon. Also, means are provided for biasing the grippers into frictional engagement with the driven member to minimize the lag between its input and output.

The orientation of the links and the angle of the mating surfaces of the gripper and driven member are chosen to provide enough friction force so that the clutch will not slip. Also, the mating surfaces are constructed to minimize wear and to develop good frictional contact even in an oily environment.

A preferred embodiment of my clutch has an external control member for adjusting the angle of the links so that the clutch will overrun selectively in one direction or the other or to free-run in both directions, as will be described more particularly later.

Thus, the present clutch provides an efficient long-wearing torque transmitting device which will suit many applications even in hostile environments. Still, however, the cost of manufacturing and maintaining the clutch is relatively low. The clutch has a small number of wear surfaces for the torque transmitted. Moreover, such wear as does occur only serves to improve the conformity of the mating clutch parts.

The clutch is further advantaged in that only a few of its parts are subjected to any great amount of stress. This means that for the most part it can be made of conventional materials which are not specially hardened. Finally, as pointed out above, the clutch is reversible and may even free-run in both directions for special applications.

BRIEF DESCRIPTION OF THE DRAWINGS

For a fuller understanding of the nature and objects of the invention, reference should be had to the following detailed description taken in connection with the accompanying drawings, in which:

FIG. 5 is a side elevational view with parts in section of still another embodiment of my overrunning clutch;

FIG. 6 is a top plan view of the clutch in FIG. 5; and

FIG. 7 is a perspective view with parts cut away of the FIGS. 5 and 6 clutch embodiment.

DESCRIPTION OF THE PREFERRED EMBODIMENTS

Figure 1:
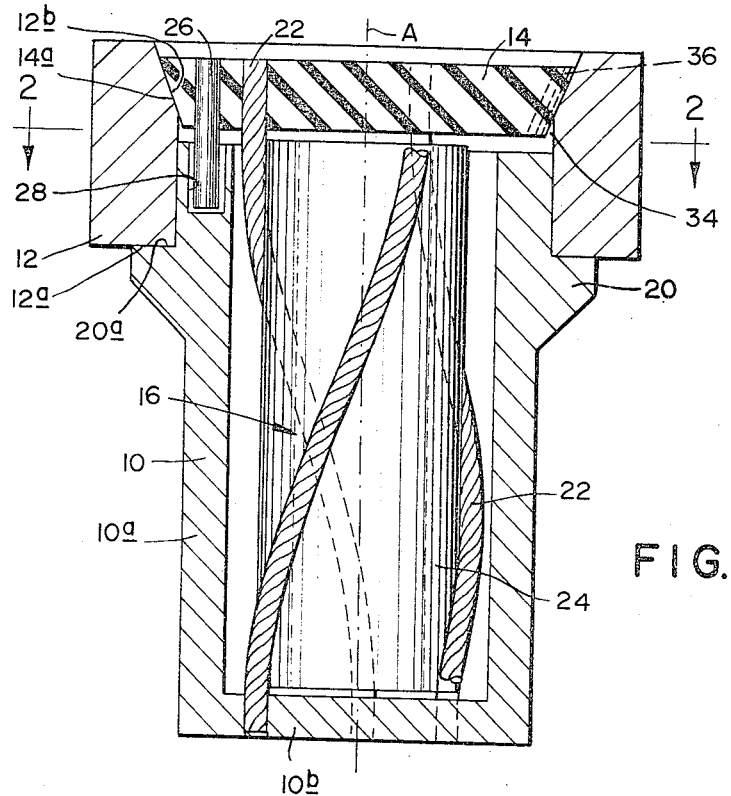
FIG. 1 is a sectional view with parts in elevation of an overrunning clutch embodying the principles of my invention.
Figure 2:
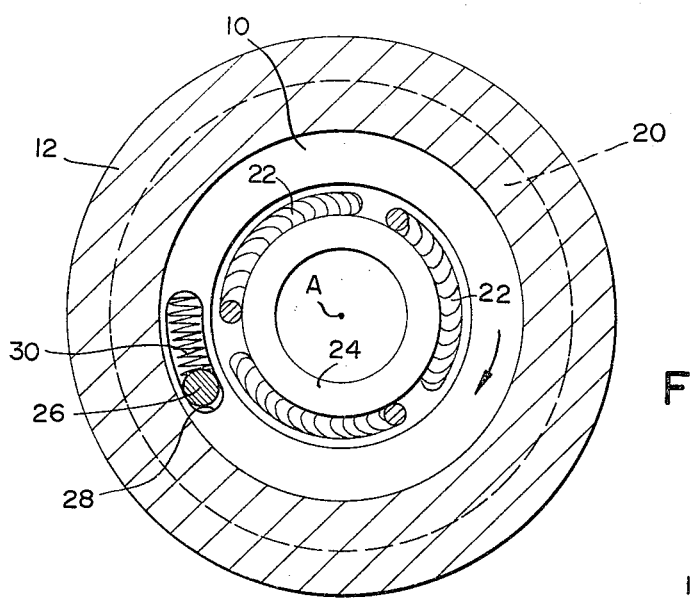
FIG. 2 is a view along line 2—2 of FIG. 1.

Referring now to FIGS. 1 and 2 of the drawings, the clutch comprises a driving member 10 and driven member 12 which rotate relatively about an axis A. Member 10 is connected to a source of rotary power (not shown) and the clutch output is taken from member 12.

A gripper 14 mounted coaxially with members 10 and 12 frictionally engages driven member 12 and tends to rotate therewith. Linking means located generally at 16 connected between driving member 10 and gripper 14 pulls gripper 14 into nonslip engagement with driven member 12 when driving member 10 rotates in one direction relative to the driven member with the result that the two members rotate in unison.

However, when driving member 10 rotates in the opposite direction relative to driven member 12, linking means 16 tends to bias gripper 14 out of engagement with the driven member so that the two members are free to rotate independently.

It should be understood at the outset that we are using the terms "link" and "linking means" to refer to either fully flexible or semi-rigid connections between gripper 14 and driving member 10 and not just to one element of a longer connection, such as a chain link. Also, if desired the functions of members 10 and 12 may be reversed.

Driving member 10 comprises a cup-like housing having a generally cylindrical side wall 10a and a discoid bottom wall 10b. A side extending flange 20 projects out from side wall 10a near the top of driving member 10. Flange 20 has a flat upper surface 20a on which the driven member 12 seats. Thus surface 20a functions as a thrust face for member 12.

Driven member 12 comprises an annulus whose inner diameter is slightly larger than the outer diameter of driving member 10. Member 12 has a flat bottom surface 12a which engages flange surface 20a. Surfaces 12a and 20a are both relatively smooth so that driven member 12 can rotate on flange 20 about axis A with minimum frictional losses. These surfaces may also be coated with tetrafluoroethylene to further reduce the friction at this point. In addition, the exposed inner edge of driven member 12 is beveled forming a conical surface 12b.

Gripper 14 is a disc-like member whose edge is beveled at 14a in correspondence with surface 12b. Gripper 14 seats in driven member 12 with its surface 14a in mating engagement with surface 12b. Driven member 12 is long enough so that there is appreciable clearance between gripper 14 and the open end of driving member 10.

Still referring to FIGS. 1 and 2, linking means 16 comprise a set of multistranded twisted wire cables 22 connected between gripper 14 and bottom wall 10b of driving member 10. In the illustrated clutch embodiment, there are three such cables 22 and they are wound helix-like in the same direction about axis A. The ends of cables 22 are attached to gripper 14 and bottom wall 10b by brazing them in suitable openings provided in these elements. A cylindrical tube 24 situated within driving member 10 maintains the helical arrangement of cables 22 and prevents them from collapsing inward toward axis A.

The length of cables 22 and their helix angle are selected so that when driving member 10 is stationary, gripper 14 lightly frictionally engages driven member 12.

A pin 26 pressed into gripper 14 extends loosely into an arcuate slot 28 in the end of wall 10a of driving member 10. This pin and slot arrangement limits the amount of relative movement between gripper 14 and driving member 10. This is to prevent possible damage to cables 22 should gripper 14 be forced, for some reason, to rotate excessively backwards relative to driving member 10.

The proper amount of frictional drag on gripper 14 insures that there is minimum lag between the input to and output from the clutch. It can be obtained by maintaining strict manufacturing tolerances for the various clutch parts. More preferably, however, means are provided to bias gripper 14 into engagement with driven member 12. Thus in the illustrated embodiment, a helical spring 30 (FIG. 2) is compressed between pin 26 and one end of slot 28. Spring 30 tends to rotate gripper 14 relative to driving member 10 so as to wind up the cable helices enough to provide the requisite drag on gripper 14.

Other means may be used to bias gripper 14 as aforesaid. For example, cables 22 can be prestressed prior to their installation so that they inherently tend to wind up the helices enough to pull gripper 14 into frictional engagement with driven member 12.

Still referring to FIGS. 1 and 2, if driving member 10 is caused to rotate clockwise in the direction indicated by the arrow in FIG. 2, driven member 12 under the load tends to remain stationary. Thus it exerts a certain amount of frictional drag on gripper 14. The coincidence of the rotation of driving member 10 in the clockwise direction and the drag on gripper 14 in the opposite direction tends to further wind up the cable helices. Thereupon, cables 22 pull gripper 14 axially toward driving member 10 so that it seats more and more firmly into the conical surface 12b of driven member 12. In this fashion, the driven member 12 is frictionally locked to driving member 10 so that the two members move in unison in the clockwise direction indicated by the arrow in the FIG. 2.

It should be noted at this point that torque is transmitted from driving member 10 to driven member 12 at two points. First, there is a certain amount of friction between mating surfaces 12a and 20a. The torque transmitted at this point increases as the axial thrust exerted by driven member 12 on driving member 10 increases during the "windup" process described above. Also, torque is transmitted by cables 22 and frictional forces at mating surfaces 14a and 12b. The total torque (T) transmitted between driving member 10 and driven member 12 may be represented as follows:

$$T = \frac{\pi}{4} N d S_T R_C \sin \alpha + \frac{\pi}{4} N d S_T R_B \quad (1)$$

where:

N = number of cables 22
d = diameter of cables
$S_T$ = the stress on each cable
$R_C$ = the radius of the cables
α = the helix angle of the cables
$R_B$ = the radius of surface 20a
$\mu_2$ = coefficient of friction at surfaces 12a and 20a.

The helix angle (α) of cables 22 is fairly critical. If angle α is too large, then the clutch will slip and not transmit torque to a load. On the other hand, if angle α is too small, then the clutch will jam and not unload when driving member 10 is rotated in the opposite direction. We have found that the clutch operates properly if angle α is kept within the following limits:

$$\mu_2 \frac{R_B}{R_C} \leq \sin \alpha \leq \frac{\mu_1}{\sin \theta} \frac{R_A}{R_C} \quad (2)$$

where:

$\mu_1$ = coefficient of friction at surfaces 14a and 12b
θ = cone angle of surfaces 14a and 12b
$R_A$ = mean radius of surface 12b As seen from Equation 1, if a larger load is placed on driven member 12, member 12 exerts more drag on gripper 14, thereby tending to tension cables 22 even more. This increases the helix angle (α) and so also increases the amount of torque transmitted at mating surfaces 12b and 14a. Thus, the frictional gripping or locking action between driving member 10 and driven member 12 accommodates itself to the particular load.

It is a feature of this invention that such wear as does occur to gripper 14 only further increases its conformance to conical surface 12b. Therefore, wear does not reduce the power transmission capability of the clutch. However, under very severe wear conditions, it may be desirable to overlap gripper 14 and its seat 12b as illustrated at 34 in FIG. 1. This minimizes the likelihood of a ridge being worn into either of the mating surfaces 12b or 14a that might interfere with the proper operation of the clutch. The same thing can be accomplished by making one or both of surfaces 12b and 14a arcuate (i.e., concave or convex). In the event that both are arcuate surfaces, then surface 14a should have a smaller radius than surface 12b.

Also, when the clutch is used in oily environments, it is desirable that provision be made for the oil to drain away rapidly from the space between surfaces 12b and 14a to quickly establish good frictional contact between these surfaces when clutching action commences. This may be done conveniently by grooving one of the surfaces radially. This is illustrated in FIG. 1 by a groove 36 in gripper 14. Alternatively, surfaces 12b and 14a may be made narrower. Also, of course, other known techniques can be employed to increase the frictional engagement between surfaces 12b and 14a. For example, these surfaces may be ribbed or knurled.

Still referring to FIGS. 1 and 2, when driving member 10 is driven counterclockwise in the direction opposite the arrow in FIG. 2, the movement of the driving member coupled with the frictional drag exerted by driven member 12 on gripper 14 in opposition to the force exerted by spring 30, tends to unwind the cable 22 helices. The cables then urge or bias gripper 14 axially away from driven member 12. Thus, member 12 is no longer frictionally locked to driving member 10 and the latter remains stationary.

It should be noted here that since there is no axial thrust exerted by gripper 14 on driven member 12, there is insufficient frictional drag exerted by flange 20 on driven member 12 to cause member 12 to rotate in the overrunning direction. Also as noted above, when driving member 10 is rotated in the counterclockwise direction, the action of pin 26 in slot 28 prevents the cable helices from completely unwinding and spoiling the operation of the clutch.

Most of the stresses developed in this clutch are imparted to cables 22 and their securements to gripper 14 and driving member 10. The forces developed at surfaces 12b and 14a and at surfaces 20a and 12a are distributed over relatively large areas so that the actual stresses at these points are kept to a minimum. As a result, the driving and driven members and gripper 14 may be constructed of regular steel or aluminum or other standard relatively low-cost materials. This feature, coupled with the fact that all of the elements in the clutch can be made by a relatively few simple grinding and milling operations, means that the cost of the clutch is kept to a minimum.

In the clutch illustrated in FIGS. 1 and 2, we have shown separate twisted wire cables 22 connected between gripper 14 and the bottom wall 10b of driving member 10. In some cases, however, a single length of relatively large diameter twisted wire rope may be used to perform the combined functions of strands 22 and tube 24. In this event, the length of rope would be connected between gripper 14 and bottom wall 10b at points around the axis A. The rope is twisted through much the same angle as the cable helices in FIG. 1. Also, the rope may be prestressed to bias gripper 14 toward driven member 12 to provide the requisite initial drag on the former member.

Figure 3:
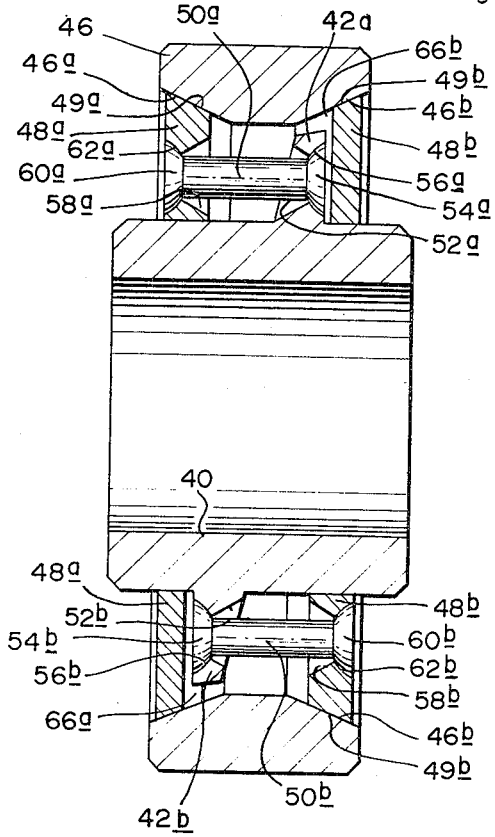
FIG. 3 is a sectional view with parts in elevation of another clutch embodiment.
Figure 4:
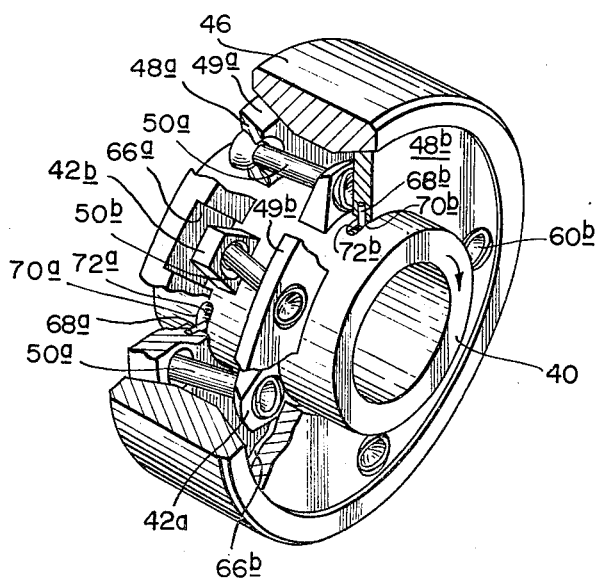
FIG. 4 is a perspective view with parts cut away of the FIG. 3 clutch.

FIGS. 3 and 4 show an embodiment of my clutch which obtains greater torque transmission for its size compared with the FIGS. 1 and 2 clutch and which also minimizes thrust stresses imposed on the clutch parts. It comprises a generally cylindrical inner race 40 which is keyed to a source of rotary power (not shown). A first set of three ears 42a extend out from the side of race 40 near one end thereof. A second set of three ears 42b also protrude out from race 40 near the other end thereof. The ears in each set are spaced equally around race 40, i.e. every 120° and the two ear sets are offset.

A coaxial, ring-like outer race 46 encircles race 40. The inner edges of race 46 are beveled, forming a pair of conical surfaces 46a and 46b which face inner race 40.

A pair of similar annular grippers 48a and 48b are positioned between races 40 and 46 at opposite ends thereof. The inner diameter of grippers 48a and 48b are slightly larger than the outer diameter of race 40 and the outer diameter of grippers 48a and 48b are slightly smaller than the inner diameter of race 46. Also, the outer edge of grippers 48a and 48b are beveled, forming a pair of conical surfaces 49a and 49b, respectively, which mate with conical surfaces 46a and 46b, respectively, on outer race 46. Thus, grippers 48a and 48b are slidable axially on race 40 toward and away from the outer race surfaces 46a and 46b, respectively.

A set of three rods 50a link ears 42a and gripper 48a. More particularly, one end of each rod 50a extends through an outsized passage 52a in the corresponding ear 42a. The end of rod 50a terminates in a hemispherical flange 54a which seats in a hemispherically countersunk hole 56a in ear 42a. The other end of each rod 50a passes through an outsized hole 58a in gripper 48a and is likewise terminated by a hemispherical flange 60a which seats in a hemispherically countersunk hole 62a in gripper 48a. Thus, rods 50a are free to swivel somewhat relative to ears 42a and gripper 48a. Gripper 48a is oriented relative to inner race 40 so that rods 50a are all tilted or inclined at substantially the same angle relative to the axis of the clutch.

Gripper 48b is linked to ears 42b on inner race 40 in exactly the same way. Thus, a set of three rods 50b are connected between ears 42b and gripper 48b. One end of each rod 50b extends through an outsized hole 52b in the corresponding ear 42b and terminates in a hemispherical flange 54b. Flange 54b seats in a hemispherically countersunk hole in ear 42b. The other end of each rod 50b passes through an outsized passage 58b in gripper 48b and terminates in a hemispherical flange 60b which, in turn, seats in a similarly hemispherical hole 62b in gripper 48b.

As seen from FIG. 4, rods 50b must be tilted relative to the axis of the clutch in the opposite direction from rods 50a in order for the two grippers 48a and 48b to operate in unison to effect the clutching action.

Still referring to FIGS. 3 and 4, when the inner race 40 is rotated in the clockwise direction indicated by the arrow in FIG. 4, the frictional drag on grippers 48a and 48b causes rods 50a and 50b to tilt or incline further and thereby pull their respective grippers 48a and 48b into nonslip engagement with the conical surfaces 46a and 46b of race 46. When this occurs, the hemispherical flanges 54a and 54b and 60a and 60b are cocked slightly in their respective seats. Therefore, in order to prevent the edges of these flanges from engaging the underside of grippers 48a and 48b, and possibly interfering with the operation of the clutch, recesses 66a are formed in the underside of gripper 48a opposite ears 42b. Similar recesses 66b are formed in the underside of gripper 48b opposite ears 42a.

To insure prompt clutch response, grippers 48a and 48b are desirably biased into light frictional engagement with race 46 by means of a pin in slot arrangement as in FIGS. 1 and 2. Thus, a pin 68a pressed into gripper 48a extends into a slot 70a in inner race 40. A spring 72a in the slot pushes against pin 68a so that gripper 48a is baised in a counterclockwise direction (FIG. 4). A similar pin 68b, slot 70b and spring 72b biases gripper 48b in the clockwise direction (FIG. 4). This feature also prevents rods 50a and 50b from reversing their angles of inclination and holds grippers 48a and 48b on race 40. Of course, other means may be used to hold the clutch parts together, e.g. flanges on inner race 40.

While the FIGS. 3 and 4 clutch employs rigid rods 50a and 50b to link the grippers to inner race 40, it will be appreciated that flexible cables such as shown in FIGS. 1 and 2 may be used in place of these rods. In this event, the torque (T) developed by the clutch may be represented as follows:

$$T = \frac{\pi}{2} N d S_T R_C \sin \alpha \quad (3)$$

Thus, Equation 3 unlike Equation 1, has only one term because the utilization of two opposing grippers cancels the thrust forces in this clutch embodiment. Thus, proper clutching action occurs where $$\sin \alpha \leq \frac{\mu_1}{\sin \theta} \frac{R_A}{R_C} \quad (4)$$

Of course, the mating surfaces 46a and 49a and 46b and 49b may be shaped or treated as described above in connection with the similar elements in FIGS. 1 and 2 to improve the clutching action.

Rotation of inner race 40 in the counterclockwise direction opposite the arrow in FIG. 4 results in rods 50a and 50b tending to straighten up. With this, they bias grippers 48a and 48b away from race 46 so that race 46 is not frictionally locked to race 40 and remains stationary.

FIGS. 5-7 show a further embodiment of my invention. This clutch can be controlled so that it transmits torque in one direction or the other or free runs in both directions, depending upon the particular application.

This clutch embodiment has a generally cylindrical inner race 80 which is keyed to a source of rotary power (not shown). A set of three pins 81 are pressed into the side of race 80 midway along its length. Pins 81 are disposed at equal angles about race 80 and protrude radially outward therefrom. A slot 82 is formed in the exposed end of each pin 81 and the opposite side walls 83a and 83b of slots 82 are rounded as best seen in FIG. 5.

A coaxial, ring-like outer race 84 encircles race 80. The inner edges of race 84 are beveled, forming a pair of conical surfaces 84a and 84b which face inner race 80. The clutch output is taken from race 84.

A pair of annular grippers 86a and 86b are positioned between races 80 and 84. The inner diameters of grippers 86a and 86b are slightly larger than the outer diameter of inner race 80 and the outer diameters of grippers 86a and 86b are slightly smaller than the inner diameter of race 84. Also, the edges of grippers 86a and 86b are beveled, forming a pair of conical surfaces 88a and 88b, respectively, which mate with surfaces 84a and 84b, respectively, of outer race 84. Grippers 86a and 86b are free to move axially on race 80 into and out of frictional engagement with outer race 84.

A flanged collar 90 having a central opening 92 slightly larger than the outer diameter of race 80 is rotatably mounted on race 80 adjacent gripper 86a. A set of three fingers 96 extend out from collar 90 between races 80 and 84. Arcuate passages 98a and 98b are provided through grippers 86a and 86b, respectively, to accommodate the three fingers 96. Fingers 96 and the openings 98a and 98b are disposed at equal angles of 120° about the axis of the clutch and are offset from pins 81 as seen in FIG. 7. The fingers hug inner race 80 and extend slightly beyond gripper 86b.

A pair of leaf springs 100a and 100b are secured to the opposite sides of each finger 96. Springs 100a and 100b are pinned at their centers to the corresponding finger and their opposite ends project out sideways away from the finger within the corresponding passages 98a and 98b in the grippers. The length of each passage 98a and 98b is such that it can accommodate the corresponding finger therein as well as both springs 100a and 100b in their neutral or unstressed condition.

Grippers 86a and 86b are linked to inner race 80 by means of a set of three stranded wire cables 104 connected between the two grippers and extending through the slots 82 in the three pins 81. The opposite ends of each cable 104 extend through the corresponding grippers 86a and 86b at points on the grippers midway between passages 98a and between passages 98b. They terminate in rocker-shaped flanges 106a and 106b which seat in similarly-shaped recesses 108a and 108b in the grippers. Thus, the ends of each cable 104 are free to rock back and forth somewhat relative to their seats 108a and 108b in the two grippers.

As best seen in FIGS. 5 and 7, collar 90 can be rotated somewhat relative to inner race 80. When this occurs, the leaf springs on the sides of fingers 96 in the direction toward which collar 90 is rotated are compressed against the adjacent ends of passages 98a and 98b. Thus, when collar 90 is rotated in the direction indicated by the arrow 110 in FIG. 7, the spring 100b on each finger 96 is compressed against the ends 99a and 99b of passages 98a and 98b respectively. The other springs 100a remain inactive. This tends to move grippers 86a and 86b in the same direction indicated by the arrow 110. Adjustment of the collar in this direction causes cables 104 to bend about their corresponding pins 81 in the manner shown in FIG. 7. The direction in which cables 104 are bent about their pins 81 determines the direction in which the clutch will transmit torque.

Thus, if cables 104 are oriented as seen in FIG. 7, rotation of inner race 80 in the counterclockwise direction indicated by the arrow 112 in FIG. 7, coupled with the frictional drag on the grippers due to springs 100b, tends to bend cables 104 even more about their respective pins 81. With this, cables 104 pull grippers 86a and 86b toward each other and into nonslip engagement with outer race 84. Whereupon, race 84 is frictionally locked to inner race 80 and rotates in the direction of the arrow 112.

If inner race 80 is now rotated in the clockwise direction opposite the direction of arrow 112, the frictional drag exerted by outer race 84 on grippers 86a and 86b causes cables 104 to straighten out and slacken. Grippers 86a and 86b are no longer frictionally locked to outer race 84 so that the clutch overruns.

In this clutch embodiment, the clutching action can be reversed simply by rotating collar 90 in the direction opposite arrow 110 in FIG. 7 until springs 100a engage the adjacent ends 99c and 99d of passages 98a and 98b respectively. In this condition, springs 100b assume their neutral condition and are inactive. Grippers 86a and 86b are thus moved in the same direction (i.e. opposite arrow 110) so that cables 104 are bent in the opposite direction about their respective pins 81 as shown by the cable 104a indicated by dotted lines in FIG. 5.

In this position of collar 90, when inner race 80 is rotated in the direction indicated by the arrow 112 in FIG. 7, cables 104a (FIG. 5) slacken. Grippers 86a and 86b are not frictionally locked to outer race 84 and race 84 is free to rotate independently. However, when race 80 is rotated in the direction opposite arrow 112, cables 104a (FIG. 5) are tensioned sufficiently to pull grippers 86a and 86b into nonslip engagement with outer race 84, whereupon race 84 rotates in the direction opposite arrow 112.

Flange 90 can also be moved to a neutral position wherein neither springs 100a nor springs 100b engage the ends of their respective passages 98a and 98b. In this situation, grippers 86a and 86b are not biased at all with the result that cables 104 remain essentially straight. Their length is such that they exert no appreciable pulling force on grippers 86a and 86b so that no frictional drag is exerted on the grippers. Now, when race 80 is rotated in either direction, the clutch overruns.

The clutch illustrated in FIGS. 5 and 7 is suitable in many applications where it is desirable to transmit torque selectively in one direction or the other, or to transmit no torque at all.

The three positions of adjustment of collar 90 relative to inner race 80 can be maintained by any suitable means such as a spring-loaded ball 116 (FIG. 5) mounted in collar 90. Ball 116 is adapted to engage in a recess 118 (FIG. 5) when collar 90 is turned to each of its three aforesaid positions of adjustment.

It will be apparent from the foregoing, then, that my improved overrunning clutch yields many distinct advantages as compared with prior comparable devices of this kind. It is relatively simple and inexpensive to make, yet it has a high torque transmission capability for its size. Due to its unique construction, the stresses developed in the clutch are localized to a relatively few components. As a result, wear on the various clutch parts is minimized. Finally, the clutch, and particularly the reversible clutch shown in FIGS. 5 to 7, is extremely versatile and can be used in most applications where unidirectional torque transmission is needed.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. An overrunning clutch comprising
   (A) a driving member,
   (B) a driven member, said members
      (1) being mounted coaxially for relative rotation about an axis,
   (C) a gripper
      (1) movable along said axis toward and away from one of said members, and
      (2) frictionally engaging said one member and tending to rotate therewith, and
   (D) a plurality of flexible cables
      (1) connected between said gripper and the other of said members,
      (2) arranged in generally conforming helices about said axis, said helices
         (a) tending to wind up when said other member rotates in one direction so that said cables pull said gripper into nonslip engagement with said one member, whereby said members move in unison, and
         (b) tending to unwind when said other member moves in the opposite direction so that said cables exert no pull on said gripper, whereby said members are free to move independently.

2. An overrunning clutch comprising:
   (A) a driving member;
   (B) a driven member, said member being mounted coaxially for relative rotation about an axis;
   (C) a gripper
      (1) movable parallel to said axis toward and away from one end of said members, and
      (2) frictionally engaging said one member along mating conical surfaces and tending to rotate therewith,
   (D) means for linking said gripper to said other member, said linking means comprising a plurality of flexible cables
   (E) connected between said gripper and said other member and
   (F) arranged in generally conforming helices about said axis, said helices
      (1) tending to wind up when said other member rotates in said one direction so that said cables pull said mating conical surfaces into nonslip engagement, and
      (2) tending to unwind when said other member rotates in said other direction so that said cables exert no pulling force on said gripper, thereby permitting slippage between said conical surfaces.

3. An overrunning clutch as defined in claim 2 wherein said mating conical surfaces overlap.

4. An overrunning clutch as defined in claim 2 wherein
   (A) the other end of said one member slidably engages said other member at a thrust face so as to prevent axial movement of said two members toward each other, and
   (B) $$\mu_2 \frac{R_B}{R_C} \leq \sin \alpha \leq \frac{\mu_1}{\sin \phi} \frac{R_A}{R_C}$$

where:

$\alpha$ = the angle of said helices
$\mu_1$ = coefficient of friction at said conical surfaces
$\mu_2$ = coefficient of friction at said thrust face
$R_A$ = mean radius of said conical surfaces
$R_B$ = radius of said thrust face
$R_C$ = radius of said cables
$\phi$ = cone angle of said conical surfaces 5. An overrunning clutch comprising:
(A) a driving member;
(B) a driven member, said members being mounted coaxially for relative rotation about an axis;
(C) a gripper
  (1) movable parallel to said axis toward and away from one end of one of said members, and
  (2) frictionally engaging said one member and tending to rotate therewith,
(D) means for linking said gripper to said other member, said linking means being arranged and adapted to
  (1) move said gripper axially into nonslip engagement with said one member when said other member rotates in one direction relative to said one member, whereupon said members move in unison in said one direction,
  (2) bias said gripper axially away from said one member when said other member rotates in the other direction relative to said one member, whereby said members rotate independently,
  (3) said linking means comprising a plurality of flexible cables
    (a) connected between said gripper and said other member,
    (b) arranged in generally conforming helices about said axis, said helices
      (i) tending to wind up when said other member rotates in said one direction so that said cables pull said gripper axially into nonslip engagement with said one member, and
      (ii) tending to unwind when said other member rotates in said other direction so that said cables exert no axial pull on said gripper.

References Cited

UNITED STATES PATENTS

| | | | |
|---|---|---|---|
| 847,128 | 3/1907 | Sullivan | 192—41 |
| 1,922,350 | 8/1933 | Bolton | 192—41 XR |
| 2,675,898 | 4/1954 | Morgan | 192—41 |
| 3,092,227 | 6/1963 | Dossier | 192—41 |
| 3,107,764 | 10/1963 | Fulton | 192—41 |

MARTIN P. SCHWADRON, Primary Examiner

L. J. PAYNE, Assistant Examiner

U.S. Cl. X.R.

192—43